United States Patent [19]

Oliker

[11] Patent Number: 4,701,189
[45] Date of Patent: Oct. 20, 1987

[54] ROTARY SORPTION BED SYSTEM AND METHOD OF USE

[75] Inventor: Michael D. Oliker, Amesbury, Mass.

[73] Assignee: Near Equilibrium Research Associates, Amesbury, Mass.

[21] Appl. No.: 790,055

[22] Filed: Oct. 22, 1985

Related U.S. Application Data

[60] Continuation of Ser. No. 675,459, Nov. 28, 1984, abandoned, which is a continuation of Ser. No. 484,186, Apr. 12, 1983, abandoned, which is a continuation-in-part of Ser. No. 361,134, Mar. 24, 1982, abandoned, which is a division of Ser. No. 166,054, Jul. 7, 1980, Pat. No. 4,324,564.

[51] Int. Cl.$^4$ .................. B01D 53/06; B01D 53/26
[52] U.S. Cl. .......................................... 55/34; 55/60; 55/78; 55/181; 55/208; 55/390
[58] Field of Search ..................... 55/31-35, 55/60, 74, 75, 77-79, 179-181, 208, 387, 389, 390

[56] References Cited

U.S. PATENT DOCUMENTS

| | | | |
|---|---|---|---|
| 1,602,500 | 10/1926 | Nuss | 55/181 X |
| 2,535,902 | 12/1950 | Dailey, Jr. | 55/33 |
| 2,562,334 | 7/1951 | Roberts | 34/34 |
| 2,675,089 | 4/1954 | Kahle | 55/62 |
| 2,699,837 | 1/1955 | Van Note | 55/33 X |
| 2,880,818 | 4/1959 | Dow | 55/62 |
| 2,993,563 | 7/1961 | Munters et al. | 55/78 X |
| 3,061,992 | 11/1962 | Russell | 55/62 X |
| 3,137,549 | 6/1964 | Kilgore et al. | 55/62 X |
| 3,177,631 | 4/1965 | Tamura | 55/79 X |
| 3,193,985 | 7/1965 | Siggelin | 55/33 |
| 3,216,178 | 11/1965 | Sauty | 55/33 |
| 3,323,288 | 6/1967 | Cheung et al. | 55/62 X |
| 3,359,706 | 12/1967 | Zankey | 55/20 |
| 3,405,510 | 10/1968 | Seal | 55/208 |
| 3,446,031 | 5/1969 | Chi et al. | 55/34 X |
| 3,542,525 | 11/1970 | Pigford et al. | 55/62 X |
| 3,619,987 | 11/1971 | Colvin et al. | 55/390 X |
| 3,738,084 | 6/1973 | Simon et al. | 55/31 |
| 3,808,773 | 5/1974 | Reyhing et al. | 55/31 |
| 3,850,592 | 11/1974 | Huffman | 55/33 |
| 3,855,719 | 12/1974 | Jonsson | 55/390 X |
| 3,950,154 | 4/1976 | Henderson et al. | 55/33 X |
| 4,012,206 | 3/1977 | Macriss et al. | 55/34 |
| 4,134,743 | 1/1979 | Macriss et al. | 55/390 X |
| 4,233,038 | 11/1980 | Tao | 55/33 |

FOREIGN PATENT DOCUMENTS

| | | | |
|---|---|---|---|
| 125180 | 9/1979 | Japan | 55/181 |
| 35994 | 11/1979 | Japan | 55/181 |

OTHER PUBLICATIONS

D. Basmadjian, On the Possibility of Omitting the Cooling Step in Thermal Gas Adsorption Cycles, Can. J. of Chem. Eng., vol. 53, Apr. 1975, pp. 234-238.

Lukchis, Adsorption Systems, Part I, Chemical Engineering, Jun. 11, 1973, pp. 111-116.

Lukchis, Adsorption Systems, Part II, Chemical Engineering, Jul. 9, 1973, pp. 83-87.

(List continued on next page.)

Primary Examiner—Robert Spitzer
Attorney, Agent, or Firm—Lahive & Cockfield

[57] ABSTRACT

Disclosed are improved recirculating sorption bed systems, e.g., rotary beds, of the type consisting of a mass of sorbent material in which one section is in sorption duty while another section is being regenerated thermally. The sorption beds may be operated to reduce heat consumption while simultaneously producing a more sorbate-free product by utilizing sensible heat added to the bed during regeneration to supply a portion of the heat or desorption required to reactivate the bed. In one embodiment, the bed system features a recirculation loop which circulates fluid between a pair of regions interposed between the edge of the sorption duty and regeneration regions. In other embodiments the bed system includes means for directing a portion of the effluent generated in early stages of the sorption duty region to supplement hot regenerant in the regeneration region and/or includes means for directing effluent generated in early stages of the regeneration region to supplement the feed in late stages of the sorption duty region.

39 Claims, 44 Drawing Figures

OTHER PUBLICATIONS

Lukchis, Adsorption Systems, Part III, Chemical Engineering, Aug. 6, 1973, pp. 83-90.

Johnston, Designing Fixed-Bed Adsorption Columns, Chemical Engineering, Nov. 27, 1972, pp. 87-92.

Wankat, The Relationship Between One-Dimensional and Two-Dimensional Separation Processes, AIChE Journal, vol. 23, No. 6, pp. 859-867.

Collins, The LUB/Equilibrium Section Concept for Fixed-Bed Adsorption, Chemical Eng. Progress Symposium Series, vol. 63, No. 74, pp. 31-35.

Rhee et al., An Analysis of an Adiabatic Adsorption Column, Chemical Eng. Journal (1) 1970, pp. 279-290.

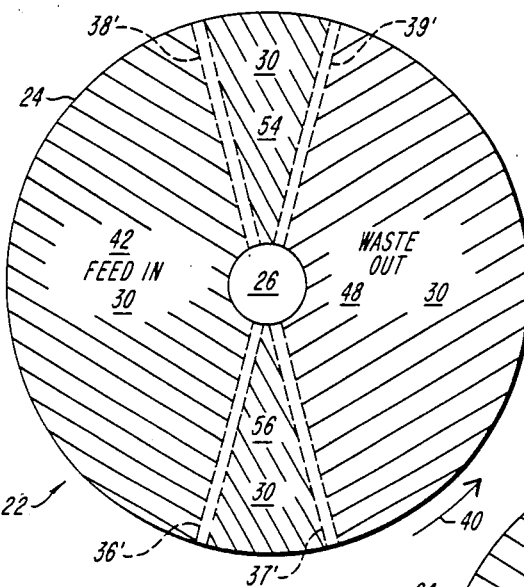
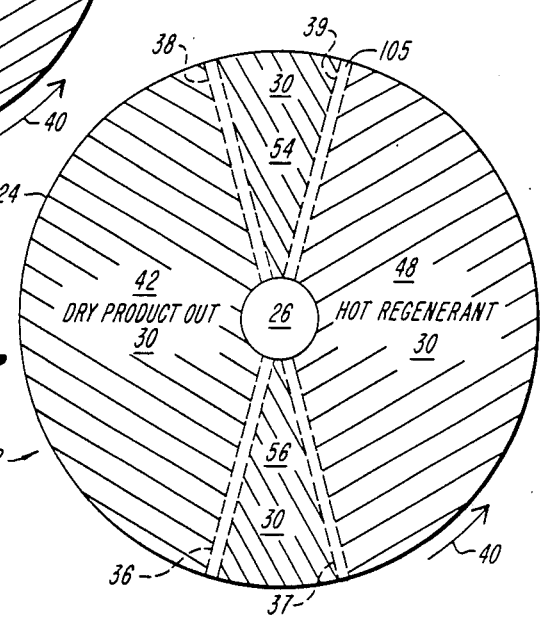
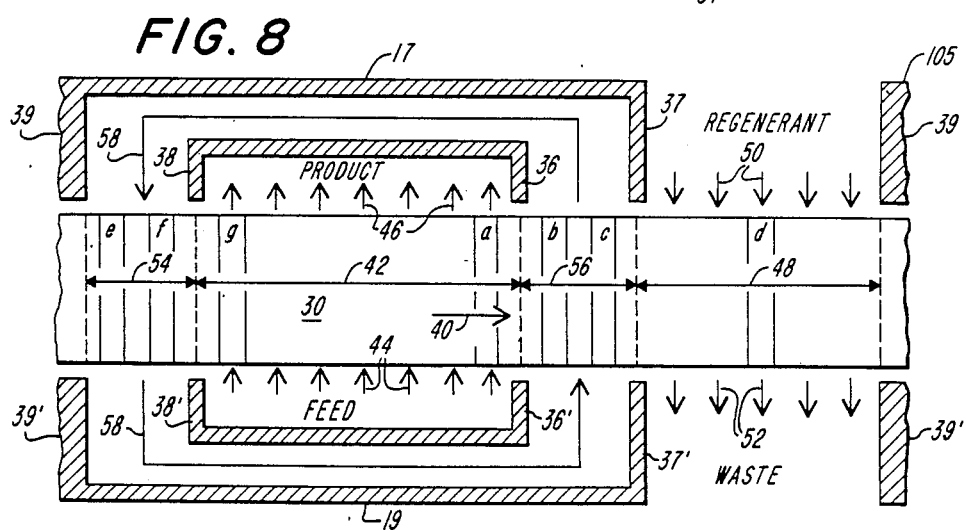

ROTARY SORPTION BED SYSTEM AND METHOD OF USE

REFERENCE TO RELATED APPLICATIONS

This application is a continuation of U.S. application Ser. No. 675,459, filed Nov. 28, 1984, now abandoned, which was a continuation of U.S. Ser. No. 484,186, filed Apr. 12, 1983, now abandoned. U.S. Ser. No. 484,186 was a continuation-in-part of U.S. Ser. No. 361,134, filed Mar. 24, 1982, now abandoned, which was a divisional of Ser. No. 166,054, filed July 7, 1980, now U.S. Pat. No. 4,324,564 issued Apr. 13, 1982. Filed on even date with the original of this application (Ser. No. 484,186) were three related U.S. applications, Ser. No. 484,184, now abandoned, 484,176, now U.S. Pat. No. 4,479,814, and 484,159, now abandoned.

BACKGROUND OF THE INVENTION

This invention relates to sorption bed systems of the type in which a mass of sorbent material is moved relative to a series of fluid streams such that a first section of the sorbent mass is in sorption duty while another section is being regenerated. More particularly, the invention relates to the design and operation of such beds so as to exploit to advantage the physical chemistry of sorption, desorption, heating, and cooling disclosed in U.S. Pat. No. 4,324,564, and to significantly improve the efficiency of the sorption-regeneration cycle in such beds.

Conventional rotary sorption bed systems utilize active sorbents such as lithium chloride immobilized on a porous support, alumina, zeolites, and other adsorbent or absorbent materials. They are used in situations where it is desired to separate a sorbable component from a fluid stream. Where the goal is to produce fluid of a reduced sorbate content, e.g., to produce dehumidified air or substantially water-free natural gas, fluid product exiting the sorption section is collected and the waste exiting the regeneration zone is discarded. In other situations, e.g., hydrocarbon recovery from an air stream, the "product" is discarded and the "waste" is collected.

Known recirculating beds may be classified as two or three stage devices. In a two-stage device, one portion of the bed mass is being loaded as a fluid feed passes therethrough in a sorption region and a second portion is simultaneously being regenerated with hot gas. As regeneration is completed, the hot, regenerated portion of the bed mass moves back into the sorption region while still hot. Product exiting from the bed in the first part of the sorption region cools the sorbent and is itself heated. In three stage devices, a cooling region is interposed between the end of the regeneration region and the beginning of the sorption region. Thus, cooling fluid passes through the hot, regenerated portion of the bed and drives out the heat, which typically is discarded as low grade waste heat, and cools the sorbent material prior to the beginning of its sorption duty.

During regeneration of conventional thermal swing sorbent beds, there is created in the bed a front, designated herein as the "RW" front, which is bounded on its downstream side by bed conditions characteristic of equilibrium between the sorbent material and fluid waste ("W", sorbate-rich effluent), and on its upstream side by bed conditions characteristic of equilibrium between the sorbent material and the hot regenerant fluid ("R"). After the regenerant has heated and dried the bed, and the RW front has exited the bed, a cooling fluid is introduced. Upon the introduction of the cooling fluid (here, for simplicity, assumed to be cool product, P), there is also created a wave or front, designated herein as a thermal front, which moves more rapidly than the RW front. The thermal front can arise in several ways. When regeneration is conducted using sufficiently hot fluid containing a substantial concentration of sorbate and the coolant is sorbate-free, a "PR" transition is created comprising a fast stripping front which removes all or most of the sorbate in equilibrium with the hot regenerant, and a thermal front which effects the major amount of temperature transition. Upstream of this transition from equilibrium with coolant to equilibrium with regenerant, the bed is in equilibrium with coolant (P). Downstream of the transition the bed is in equilibrium with regenerant ("R"). Other situations, where sorbate is present in the regenerant and/or the coolant, produce multiple fronts which together form the PR transition, one of which comprises the major thermal front. When regeneration and cooling are accomplished using substantially sorbate-free fluid, the PR transition is a pure thermal wave which is bounded on its downstream side by bed conditions characteristic of equilibrium between the sorbent and the hot regenerant fluid, and on its upstream side by bed conditions characteristic of equilibrium between the sorbent and the cooling fluid.

U.S. Pat. No. 4,324,564 discloses a novel method of operating sorption beds (the "Four Front System") and apparatus for practicing the method. In accordance with the teachings of the patent, it is possible to significantly reduce the quantity of heat needed for regeneration, to increase the throughput of a bed of a given size, to decrease the size and thus the capital costs of a bed system required to achieve a given capacity, to upgrade the quality of the product (reduce sorbate concentration), and/or to provide greater security against breakthrough of feed during the sorption stage.

The patent discloses that the cooling fluid may be introduced into the bed prior to the breakthrough of the midpoint of the RW front through the bed exit to achieve one or several of the foregoing operational advantages. Preferably, introduction of the cooling fluid is timed such that the thermal component of the PR transition is present in the last third of the bed length or most preferably at the fluid exit when the slower RW front is at or breaking through the fluid exit. Operation of the bed in this manner can result in a waste fluid whose temperature as measured at the bed exit never attains the temperature of the hot regenerant. As one result, significantly less heat is required to regenerate the bed.

In the practice of the Four Front Method, the precise timing of the beginning and end of the sorption stage and the hot regenerant and cooling fluid steps of the regeneration stage for a given system depends primarily on bed length, the particular sorbate-sorbent pair involved, fluid flow rates, and a balancing of the importance of the desired product characteristics, the reduction in heat consumption, the desired degree of security against breakthrough, and the maximization of throughput.

SUMMARY OF THE INVENTION

The instant invention provides methods and sorption bed system designs for exploiting the Four Front Method in the context of recirculating sorption bed systems. The phrase "recirculating sorption bed system" as used herein means a system wherein a mass of sorbent material is moved relative to a series of fluid streams so that a given volume of the sorbent material, in a cycle of operation, is passed through a sorption stage, a regeneration stage, and then returned to the sorption stage.

In one embodiment of the invention, fluid is circulated between two separate regions through which the sorbent mass passes, one of which follows the sorption duty region and precedes the regeneration region, and the other of which follows the regeneration region, and precedes the sorption region. The effect of this is to remove heat contained in the bed at or near the end of regeneration and to add this heat to aid in regeneration of the bed mass freshly loaded with sorbate. Stated differently, the effect is to use the sensible heat contained in the bed to provide latent heat of desorption needed for regeneration. The system of the invention includes ductwork or conduits serviced by a fan or other fluid mover for channeling the circulation, and the recirculating flow may be fed in part by the hot regenerant, fluid waste, product, or feed streams. In one important use of the system, the feed comprises moist air drawn from an enclosed air volume, the product is dehumidified air which is returned to the enclosed volume, and the regenerant comprises heated air from outside the enclosed volume.

In a second embodiment, fluid feed is passed through a region containing sorbent material which follows the regeneration region and precedes the sorption region, and the effluent is used to supplement the hot regenerant. In another embodiment, which may be used alone or in combination with the second embodiment, hot regenerant is passed through a region containing sorbent material which follows the sorption duty region and precedes the regeneration region, and the effluent is used to supplement the feed.

In a third embodiment, related to the second embodiment, a portion of the product is passed through a region which follows the regeneration region and precedes the sorption region, and produces an effluent stream having the characteristics of waste. In another embodiment, which may be used alone or in combination with the third embodiment, a portion of the waste exiting the regeneration region is passed through a region which follows the sorption region and precedes the regeneration region, and produces a cool dry effluent having the characteristics of product.

Objects of the invention include the provision of an improved recirculating sorption bed system and a method of operating such a bed system which avoids the generation of excess waste heat, reduces the bed size needed to achieve a given throughput, reduces the quantity of regeneration fluid needed, and/or allows a larger margin of safety against the release of sorbate into the product stream. Another object is to provide an improved sorption bed and a method of operating a sorption bed which insures a product of higher and more uniform purity. Another object is to decrease heat consumption in thermal swing recirculating sorption bed systems by utilizing sensible heat contained in the bed for regenerating the bed. Still another object is to provide a cool product in recirculating sorption bed systems without discarding the sensible heat of the bed.

Another object is to provide a rotary bed system that returns sorbent material to sorption duty with a loading of sorbate that is smaller than prior art beds which return the bed to sorption duty without a separate cooling step. Yet another object is to provide rotary sorption beds of the type described for use in dehumidifying an enclosed volume which has a built-in capability for providing ventilation in the enclosed volume with no substantial net heat exchange between the enclosed volume and outside air.

These and other objects and features of the invention will be apparent from the following description and from the drawing, wherein like reference characters in the respective drawn figures indicate corresponding parts.

BRIEF DESCRIPTION OF THE DRAWING

FIG. 6 is a cross-sectional view from the right side of FIG. 5 illustrating plane A of FIG. 5;

FIG. 7 is a cross-sectional view from the right side of FIG. 5 illustrating plane B of FIG. 5;

FIG. 8 is a diagram useful in explaining the operation of the rotary sorption bed of FIGS. 5, 6, and 7. FIG. 8 illustrates the rotary bed in linear fashion, and depicts volumes of the bed mass and fluid streams as if the rotary bed of FIG. 6 were cut radially at 105 and then stretched out linearly so as to enable observation of bed regions along its circumference;

FIGS. 8b', 8c', 8e', and 8f' are diagrams similar to FIGS. 2A–2G illustrating the state of a bed volume at the points b, c, e, and f in FIG. 8 with reverse circulation flow relative to that shown in FIG. 8;

FIG. 10a is a cross-sectional view taken at plane A of FIG. 9 similar to FIG. 6; FIG. 10b is a cross-sectional view taken at plane B of FIG. 9 similar to FIG. 7; and FIG. 11 is an illustration similar to FIG. 8 which depicts volumes of the bed mass and fluid streams as if the rotary bed of FIG. 10a were cut radially at 103 and then stretched out linearly so as to enable observation of bed volumes along its circumference;

DESCRIPTION

FRONT BEHAVIOR

In the normal operation of sorption beds, a fluid feed bearing a sorbate (e.g., water vapor) enters the bed and is "purified" as the sorbate is sorbed (loaded) onto the sorbent material (e.g., silica gel). A fluid product of significantly reduced sorbate concentration exits the bed. When the bed is loaded to its capacity, the product begins to exhibit increasing sorbate content, and the bed must be regenerated.

Changes in a sorption bed take place through the medium of waves or fronts. These consist of profiles or spacial variations in the concentration of sorbate (y) in the fluid in the bed, loading of the sorbate on the solid (l) and temperature of the solid and fluid (T). The fronts move along the bed in the direction of fluid flow but at a much slower rate. A front consists of a transition from one equilibrium condition in the bed to another. From the midpoint of the front, each equilibrium condition is approached asymptotically. As the front moves, the sorbent material and the fluid in the bed exchange heat and mass. For example, during a sorption stage, the upstream section of the bed that is near equilibrium with the fluid feed grows progressively larger while the downstream section that is near equilibrium with the fluid product grows progressively smaller. The fluid product exiting the bed is thus substantially in equilibrium with the original (pre-sorption) condition of the bed. As sorption continues, the product exiting the bed moves progressively further from this equilibrium state as the front reaches the bed exit and in the extreme (as the sorption front breaks completely through) approaches a composition identical to the feed.

For convenience, the various fronts discussed herein are named for the equilibrium conditions which bound them, with F representing feed, R representing regenerant, P representing product (and cooling fluid), and W representing waste. Thus, for example, the sorption front described above is termed an FP front.

Figure 3:
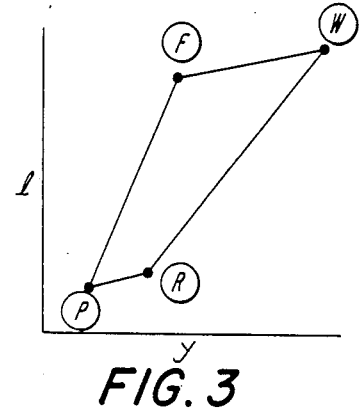
FIG. 3 is a graph of sorbate loading (l) versus sorbate/fluid ratio (y) useful in explaining the effect of front collisions within the bed and the characteristics of bed regions in equilibrium with feed (F), product (P), regenerant (R), and waste (W)

FIG. 3 is a graph of sorbate loading vs. sorbate concentration. It shows, at points F, W, P, and R, the conditions in a given section of sorbent material that is in equilibrium with feed, waste, product, and regenerant. As shown, l and y are highest for waste and lowest for product. l and y for feed and regenerant are intermediate between the extremes of waste and product. l is typically higher for feed than for regenerant. The lines between, for example, F and W, schematically represent conditions of l and y through an FW front. On collision of any two fronts, two new fronts having the characteristics of the other two fronts are produced. The graph is helpful in determining what new fronts are created. Specifically, when an FP front collides with a PR front, fronts having the characteristics of FW and WR fronts are created, and vice versa. When a PF and FW front collide, fronts having characteristics similar to PR and RW fronts are created, and vice versa. When a fluid depicted on one corner of the plot is introduced to a bed volume which is in equilibrium with the fluid at the opposte corner, two fronts are created. For example, feed (F) introduced into a bed volume in equilibrium with regenerant (R) creates a slow FP front in a faster PR front.

As disclosed in U.S. Pat. No. 4,324,564, when $\Delta y$ across a front is equal to zero (i.e., when no sorption or desorption is taking place), the velocity of the front, (a "thermal wave") depends only upon fluid flow rate and the ratio of the heat capacities of the fluid and solid. When $\Delta y/\Delta T$ across a front is greater than zero, a "fast front" results; when $\Delta y/\Delta T$ is less than zero, a "slow front" results.

THE SORPTION STAGE

The sorption or FP front behaves identically in the prior art and in the method of this invention. Specifically, the entering fluid feed is cool and contains a relatively large amount of sorbate, and the exiting product leaves the bed at a somewhat higher temperature and is largely sorbatefree. The bed, initially warm and sorbate-free for the most part, gains sorbent and loses heat as fluid is passed therealong. If no separate cooling step is conducted, at the beginning of the sorption stage the bed contains a sorbate loading in equilibrium with the regenerant. Introduction of a separate coolant will cool the bed and possibly reduce its loading, depending on the sorbate content of the coolant.

In recirculating beds during all stages the sorbent mass is in motion relative to the fluid streams. Before the sorbate concentration of the fluid product exiting the mass of sorbent passing through the sorption region of the bed system begins to rise significantly (i.e., before the leading portions of the FP front exits the bed), the sorbent volume in the sorption region moves to the regeneration region. Thus, the movement of a given volume of sorbent mass, and the location of fluid streams relative to the volume, dictate when regeneration, cooling, and sorption begin and end.

Figure 1:
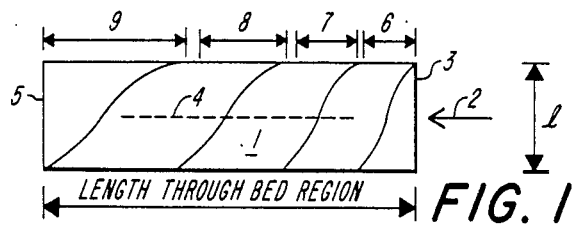
FIG. 1 is a schematic illustration of a section along the flow path of a sorption bed volume useful in describing the sorption stage and the concept of a front wherein bed loading (weight ratio of sorbate to solid) is depicted graphically on the section's vertical axis.

Referring to FIG. 1, the characteristics of a typical FP front are illustrated. Fluid feed entering a volume of sorbent material 1 in the direction of arrow 2 (right to left) at feed entrance 3 passes along the fluid flow path 4 and leaves the bed at exit 5. The length of the sorption front at various times during its passage along flow path 4 is shown at 6, 7, 8, and 9. As illustrated, as the front passes through the bed, the fraction of bed length where a loading gradient appears may grow progressively larger. During sorption, $\Delta l$, and $\Delta y$ across the front in the direction of flow are negative. The length of bed remaining (as measured from the midpoint of the front) when sorption is terminated (and the illustrated volume of bed mass moves on to the regeneration region) determines how much of the bed is left unloaded.

CONVENTIONAL OPERATION

The following description is somewhat simplified for purposes of clarity of explanation.

FIGS. 2A-2G comprise a series of diagrams illustrating changes in bed loading, sorbate concentration in the fluid, and temperature during regeneration. The diagrams illustrate one complete cycle of operation of a given bed volume which passes through a sorption region, a regeneration region, and then back to sorption without a separate cooling step. In the situation illustrated, regeneration is conducted with a substantially sorbate-free hot fluid, here assumed to be heated product. However, as will be discussed hereinafter, both in the prior art and in the operational method of this invention, neither the hot regenerant fluid nor the cooling fluid need necessarily be sorbate-free.

Figure 2A:
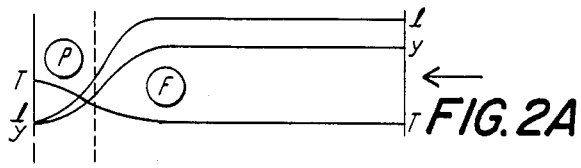
FIGS. 2A–2G are schematic diagrams illustrating the sequence of events which occurs in a given bed volume during a complete cycle in a recirculating sorption bed operated in the conventional (prior art) manner with no separate cooling stage. The horizontal axis represents the length of the bed volume in the direction of fluid flow, and the vertical axis represents increasing (upward) temperature (T), bed loading (l) and sorbate/fluid weight ratio (y)

At the completion of the sorption stage, the conditions of bed loading, sorbate concentration in the fluid, and temperature in the bed volume is depicted in FIG. 2A. In the usual case, as shown in FIG. 2A, the zone of increasing bed loading (l) and sorbate concentration (y) representing the loading or FP front will not be allowed to exit the bed.

Figure 2B:
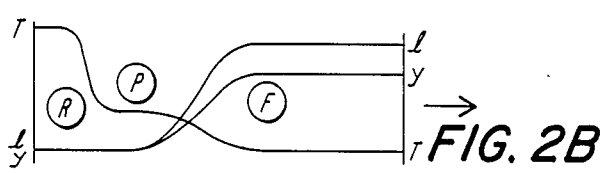

As shown in FIG. 2B, regeneration starts as a hot dry regenerant fluid (R), enters the bed volume in a countercurrent direction to the sorption stage flow. As the fluid enters the flow path, it first encounters the unused bed which is cool and substantially unloaded, giving rise to a pure thermal front designated RP. $\Delta y$ in this region is substantially zero, so the RP front moves at or slightly faster than velocity $m_f/C$, (mass of bed traversed per unit time), where $m_f$ is the fluid flow rate (in mass of gas) and C is the ratio of the heat capacity of the gas to the heat capacity of the sorbent. Loading and sorbate concentration do not substantially differ on opposite sides of the RP front illustrated in FIG. 2B, but bed temperature on opposite sides of the front changes.

Figure 2C:
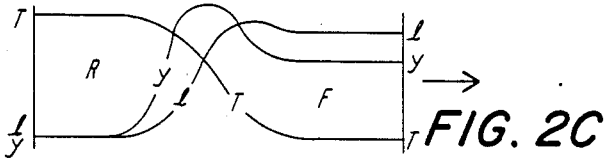

The RP front immediately begins to collide with the less loaded end of the slow sorption front, then moves into progressively more loaded regions. This slow front, designated FP, is illustrated in FIG. 2A and 2B, and is bounded by a bed section wherein T, y and l are characteristics of equilibrium with feed (section F) and by a bed section wherein T, y, and l have values characteristics of equilibrium between the sorbent and product (section P). As shown in FIG. 2C, the collision of the RP and PF fronts causes an increase in the equilibrium fluid concentration (y). Sorbate is stripped off the bed, but is resorbed downstream, heating and loading the bed.

Figure 2D:
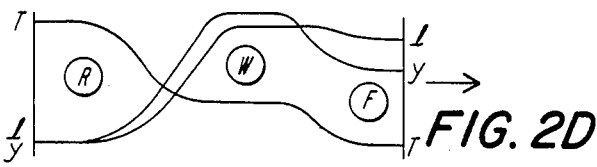

As the RP front collides and passes through the FP front, a pair of new fronts are created, designated RW and WF (FIG. 2D). Front WF is a fast desorption front (velocity greater than $m_f/C$) bounded by downstream bed conditions characteristic equilibrium with feed and upstream bed conditions characteristic of equilibrium with sorbate-rich waste fluid produced during regeneration. The RW front is a slow desorption front bounded by a downstream bed section in equilibrium with waste and an upstream section in equilibrium with regenerant fluid. As illustrated, region W of the bed appears as a plateau in which the equilibrium temperature of the bed is intermediate that of the regenerant fluid and the feed fluid, and bed loading and sorbate concentration are high. Because of the difference in speed between the RW and WF fronts, the plateau represented by the region W lengthens as regeneration continues. The collision and transformation of the fronts are of course not instantaneous. Also, plateau W may exhibit variations as the new fronts contract and expand during formation.

Fast front WF quickly passes through the bed and breaks through the bed exit, at which time an increase in the temperature and a large increase in the sorbate concentration of the effluent is observed. As regenerant fluid continues its passage through the bed volume, the RW front moves therealong. Its breakthrough is depicted in FIG. 2E.

In a well-designed bed constructed and operated in accordance with the prior art, just as the RW front breaks through the bed exit, the volume of bed mass moves back to sorption duty. FIG. 2F shows what subsequently occurs. Feed entering countercurrent to the flow in FIG. 2E collides with regenerant and two fronts form; a fast PR front across which $\Delta y$ is essentially zero (thermal wave); and a slower PF front wherein $\Delta y$ and $\Delta l$ are negative and T increases slightly. Hot dry fluid (regenerant) exits the bed, raising the average temperature of the product. When the PR front comes through, cooler dry product exits the bed. Feed is thereafter continued as the bed volume continues to move in the sorption region, until the profile in the bed region again is as shown in FIG. 2A.

Figure 2E:
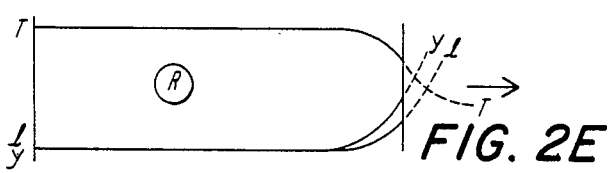
Figure 2F:
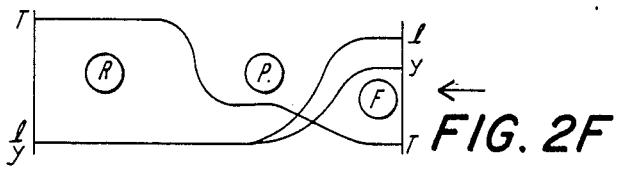
Figure 2G:
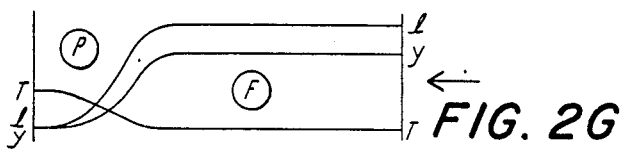

In another conventional system, a cooling fluid is passed through the bed after the bed volume reaches the state depicted in FIG. 2E, either concurrent or countercurrent to the regenerant flow. The introduction of such cooling gas creates an RP front (cooling gas assumed to be portion of product), a thermal wave which cools the bed region prior to its return to sorption duty, and a fast stripping front which removes remaining sorbate from the bed volume.

Figure 4:
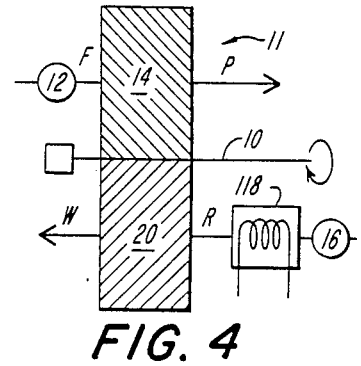
FIG. 4 is a schematic illustration showing a conventional rotary bed system viewed radially, showing the sorption and regeneration regions and apparatus for passing fluid streams through the regions.
Figure 5:
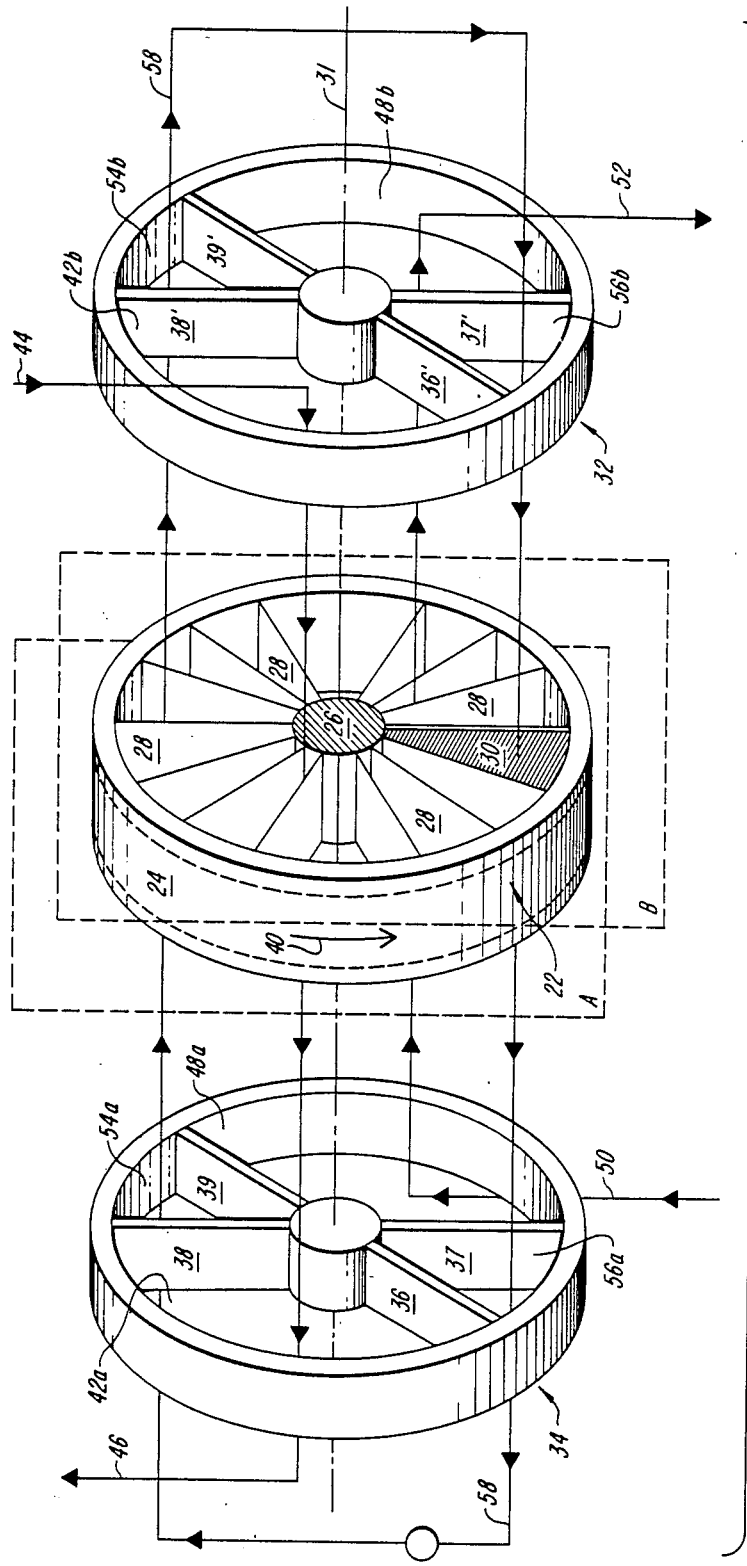
FIG. 5 is an exploded, partly schematic, perspective view of a first embodiment of the invention showing a circulation loop.

FIG. 4 schematically illustrates a rotary bed 11 which operates in accordance with the foregoing description of a conventional bed. The bed rotates about axis 10. Feed, e.g. moist air from an enclosed volume, forced by air mover 12, passes axially through the upper hemisphere 14 or sorption region of the bed as the bed rotates. A given volume of the bed, in passing through hemisphere 14, goes through the sequence of events depicted in FIGS. 2F-2A. Dry product results which is directed back to the enclosed volume. Outside air forced by air mover 16 passes through heater 18 to form hot regenerant. The regenerant in turn passes through lower hemisphere 20, which comprises the regeneration region, creating waste that is discarded. A given volume of the sorbent mass in bed 11, during passage through hemisphere 20, goes through the sequence of events depicted in FIGS. 2B-2E.

In its broadest aspects, the method and apparatus of the invention involve operation and design of recirculating sorption beds so as to utilize sensible heat, added to the sorbent mass as it passes through a regeneration region, to provide heat of desorption. Two distinct types of bed configurations are disclosed herein which accomplish this goal. The first involves a recirculation of fluid from one bed region to another, and will be described with reference to FIGS. 5-8, and 12-15. Variations of this type are described with reference to FIGS. 17 and 18. The second type are described with reference to FIGS. 9-11, 16 and 19.

EMBODIMENT OF FIGS. 5-8, and 12-15

Referring to FIGS. 5, 6, 7, and 8, a rotary bed 22 comprises an exterior cylindrical housing 24, a central hub 26, and plural spokes 28 joining the hub to the housing. Sorbent material 30 (shown schematically in only one portion of the bed in FIG. 5 for simplicity) is contained within the volume of the housing and forms, for example, a substantially continuous, gas-permeable mass of sorbent material defining an interstitial volume or an absorbent salt disposed upon a solid support matrix. Rotary bed 22 is serviced by plenum structures 32 and 34 on its front and back sides. Vanes 36 and 37, 38 and 39 in plenum structure 34, and vanes 36' and 37', 38' and 39' in plenum structure 32 define plural means for passing fluid streams through sorbent mass 30 as it rotates about axis 31. Vanes 36, 37, 38, and 39 and 36', 37', 38', and 39' are shown in phantom in FIGS. 6 and 7, and are also illustrated schematically in FIG. 8. In operation of the illustrated embodiment, plenum structures 32 and 34 remain fixed and the bed 22 rotates in the direction of arrow 40 by means of an axial or circumferential drive system (not shown). If desired, however, bed 22 may remain stationary and plenum structures 32 and 34 could be rotated synchronously to achieve the same operation. The same is true for all of the embodiments disclosed herein.

The spaces 42a and 42b defined between vanes 36 and 38 and 36' and 38', respectively, and the space in the bed filled with moving sorbent mass 30 between spaces 42a and 42b, defines a first region 42 where sorption takes place. Vanes 38, 36, 38' and 36' comprise first means for passing a fluid feed, illustrated by arrows 44, through the first bed region 42 to produce a fluid product 46 of the reduced sorbate concentration.

The spaces between vanes 36 and 37 and 36' and 37', shown at 56a and 56b, and the space in the bed filled with moving sorbent mass 30 between spaces 56a and 56b, define a a second region 56.

The spaces 48a and 48b defined between vanes 37 and 39 and 37' and 39' respectively, and the space in the bed filled with moving sorbent mass 30 between spaces 48a and 48b, define a third region 48 where regeneration takes place. Vanes 37 and 39 and 37' and 39' comprise third means for passing a hot regenerant, illustrated by arrows 50, through the third bed region to produce a fluid waste 52.

Similarly, the spaces between vanes 38 and 39 and 38' and 39', respectively, shown at 54a and 54b, and the space in the bed through which sorbent mass 30 moves between spaces 54a and 54b, define a fourth region 54. Vanes 36, 37, 36', 37', 38, 39, 38' and 39', together with ducts 17 and 19, comprise means for circulating fluid through the sorbent mass 30 as it passes through the second region 56 and fourth region 54. In the embodiment shown in FIGS. 5 and 8, the circulating fluid stream is shown at 58 flowing through the second region 56 cocurrent to the flow in the first sorption region 42. However, the circulating stream 58 may flow in the opposite direction as explained below.

From the foregoing it will be appreciated that a given volume of sorbent mass in bed 22, during 360° of rotation of the bed about its axis 31, will sequentially pass through first region 42, second region 56, third region 48, and fourth region 54.

In FIG. 8, a volume of sorbent as it passes points a, b, c, d, e, f, and g are illustrated to facilitate explanation of the sequence of events that occur within the volume as it moves through regions 42, 56, 48, and 54. The temperature and sorbate loading profiles in the volume at the respective points is shown in FIGS. 8a-8g.

Figure 8A:
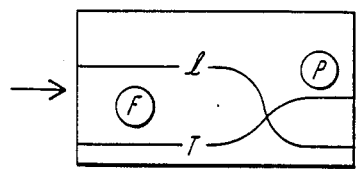
FIGS. 8a–8g are diagrams similar to FIGS. 2A–2G illustrating the state of a bed volume at the points labeled a–g in FIG. 8.
Figure 8B:
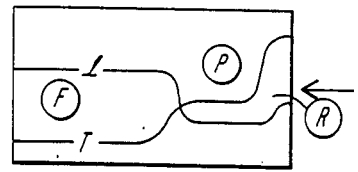
Figure 8B:
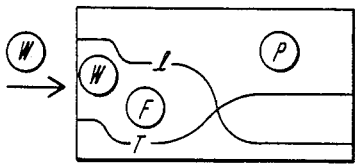
Figure 8C:
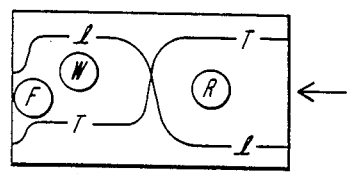
Figure 8C:
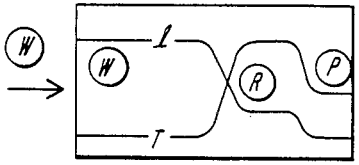
Figure 8D:
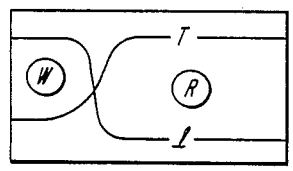

When the bed volume is at point a, sorption duty is almost complete and an FP front is disposed within the volume. Fluid feed 44 enters the bed and product of reduced sorbate concentration 46 exits it. When the volume at point a moves to point b into the second region 56, and when the circulating stream is passing in the direction of arrow 58, the circulating stream brings waste to enter the bed cocurrently to feed stream 44. A WF front is created as shown in FIG. 8b and product continues to exit. By the time the volume moves to late stages of the second region 56 (point b to point c) the WF and FP fronts collide and create fronts having the characteristics of WR and RP fronts (FIG. 8c). Product is still exiting the sorbent volume. The volume next moves into the third region 48 (e.g., point d) where regeneration takes place. Preferably, the RP front's position is just inside the bed volume as the volume passes by vanes 37 and 37'. Hot regenerant gas 50 moves countercurrently into the sorbent material in third region 48 and waste 52 leaves the sorbent material. The front profile in the bed volume is shown in FIG. 8d.

Figure 8E:
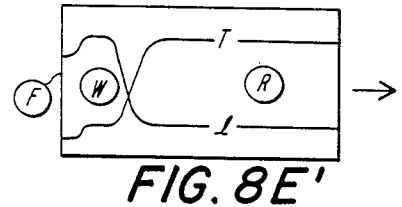
Figure 8E:
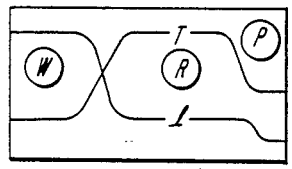
Figure 8F:
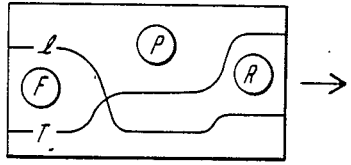
Figure 8F:
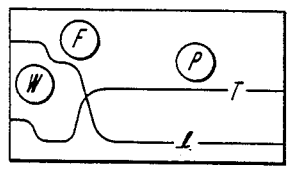
Figure 8G:
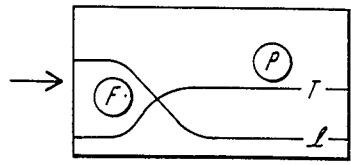

Preferably prior to the time the RW front exits the bed volume, the volume moves to the fourth region 54 (points e and f) where product carried by the circulating stream exiting from the second region 56 is passed through the sorbent mass, cocurrent to the regenerant, and waste is ejected into the circulating stream and brought back to the second region 56. As shown at FIG. 8e, the product gas first forms a PR front at point e, and by the time the sorbent volume has moved to point f, a PR, RW collision has occured to create PF and FW fronts (FIG. 8f). Preferably, the breakthrough of the FW front coincides approximately with the movement of the bed volume past vanes 38 and 38'. At that point feed stream 44 enters the bed countercurrent to the preceding stream and, as shown in FIG. 8g, and FP front moves along the bed volume, creating product 46. As the bed mass continues to move, the cycle is repeated.

As can be appreciated from the foregoing, the only heat which is discarded is that contained in fluid waste stream 52 which approximately equals the heat of desorption necessary to dry the bed plus the heat used to warm the waste stream. Sensible heat added to the bed during the regeneration stage is extracted in fourth region 54 and used to warm the bed in preparation for regeneration in second region 56. Furthermore, no significant quantity of heat is delivered together with the product, and the sorbent mass is moved into sorption duty with low loading, at its upstream end, so that exiting product is cool and dry.

It should be noted at this point that front WF in region 56 is typically faster than front PR in region 54. This sets up an imbalance that may be dealt with in several ways. For example, the length of the regions and/or the flow rate in the recirculating stream 58 may be set so as to assure that faster front WF remains in the bed volume. Another option is to design recirculating stream 58 such that it communicates with outside air. Still another option is to design recirculating stream 58 such that it communicates with a portion of the feed, product, regenerant, or waste lines as disclosed hereinafter with reference to FIGS. 12-15.

If circulating stream 58 is circulated in the opposite direction, similar results are achieved. In this case, as shown in FIGS. 8b', 8c', 8e', and 8f', in the second region 56 regenerant gas from fourth region 54 enters the bed volume at point b and creates an RP front, and by the time the bed volume has moved to point c, an RP-PF collision has occurred to create an RW front and a WF front. During the time the bed volume is in the second region 56, feed exits and is circulated to fourth region 54. There the feed forms an FW front at point e (FIG. 8e), and by the time the volume has reached point f, the FW and WR fronts have collided to create FP and PR fronts. During the time the bed volume is in the fourth region 54, regenerant exits and is circulated to second region 56.

Figure 12:
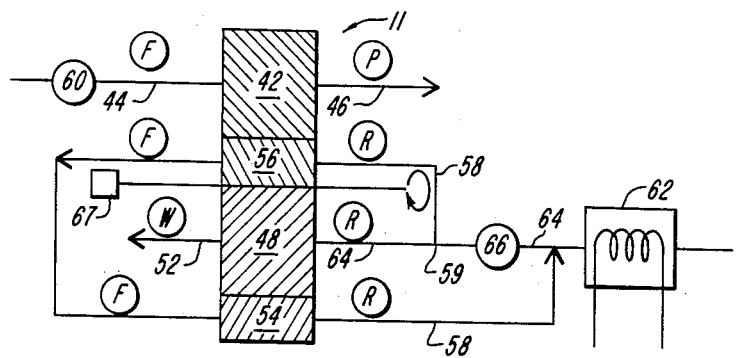
FIG. 12 is a schematic illustration, similar to FIG. 4, showing a bed system embodying the invention shown in FIGS. 5, 6, 7, and 8 viewed radially illustrating a two-blower flow stream configuration with the recirculating stream in communication with a portion of the regenerant stream.

FIG. 12 illustrates a flow stream arrangement using two gas movers for operating the embodiment of the invention set forth above wherein the recirculating stream 58 moves through second region 56 countercurrent to the feed stream in the first region 42. Feed is passed through first region 42 impelled by blower 60 and fluid product stream 46 exits region 42. Gas enters heater 62 and becomes hot regenerant. The hot regenerant stream, illustrated at 64, is supplemented by regenerant emanating from fourth region 54, moved by blower 66, and passed through third region 48 to produce fluid waste stream 52. The circulating stream 58 has an inlet 59 downstream from blower 66. Rotary movement is imparted to the bed by motor and gear box 67.

Figure 13:
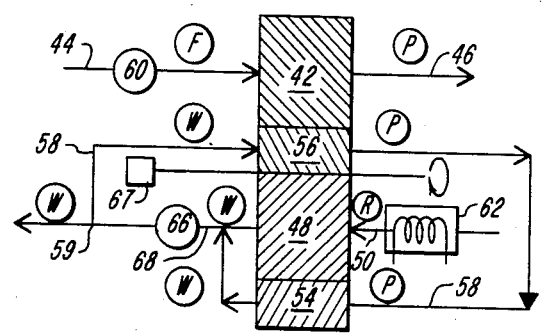
FIG. 13 is a schematic illustration of a rotary bed system embodying the invention shown in FIGS. 5, 6, 7, and 8 viewed radially illustrating a second two-blower flow stream configuration with the recirculating stream in communication with a portion of the waste stream.

FIG. 13 illustrates a flow stream arrangement of a similar type for use in the embodiment shown in FIGS. 5-8 wherein the circulating stream circulates in the opposite direction. The sorption region 42 operates identically to that of FIG. 12. Gas enters heater 62 and becomes a hot regenerant stream 50, which is passed through the third region 48 to regenerate the bed and produce a waste stream 68. The waste stream is supplemented by waste from circulating stream 58, and moved away from the bed by blower 66. Downstream from the blower is an inlet 59 in circulating stream 58.

Figure 14:
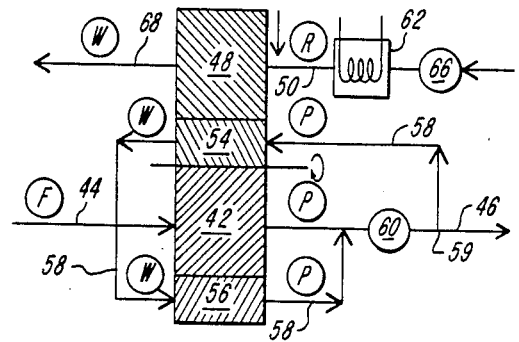
FIG. 14 is a schematic illustration of a rotary bed system embodying the invention shown in FIGS. 5, 6, 7, and 8 viewed radially illustrating a two-blower flow stream configuration with the recirculating stream in communication with a portion of the product stream.
Figure 15:
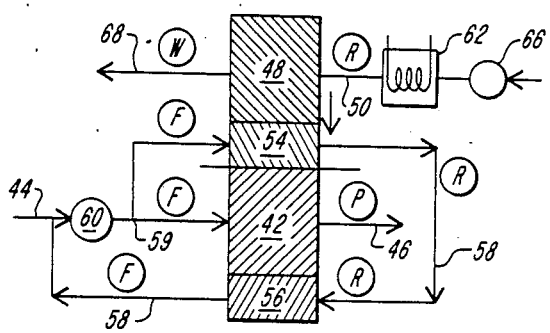
FIG. 15 is a schematic illustration of a rotary bed system embodying the invention shown in FIGS. 5, 6, 7, and 8 viewed radially illustrating a two-blower flow stream configuration with the recirculating stream in communication with a portion of the feed stream.

FIGS. 14 and 15 illustrate additional flow steam arrangements for use with the embodiment of FIGS. 5-8 wherein the recirculating stream 58 communicates with a portion of the product stream 46 (FIG. 14) and the feed stream 44 (FIG. 15). The operation of the embodiment shown in FIG. 14 is substantially identical to that described with reference to the direction of flow of the recirculating stream 58 in FIG. 13. The operation of the embodiment shown in FIG. 15 is substantially identical to that described with reference to the direction of flow of recirculating stream 58 in FIG. 12. The flow arrangements shown in FIGS. 12-15 have two advantages. First, a separate air mover for moving the circulating stream 58 is not required. Second, the arrangement provides a certain degree of flexibility in controlling the fluid flow rates in the second, third, and fourth regions so that the mass balances in the regions can be maintained.

THE EMBODIMENTS OF FIGS. 9-11, 16, AND 19

Figure 9:
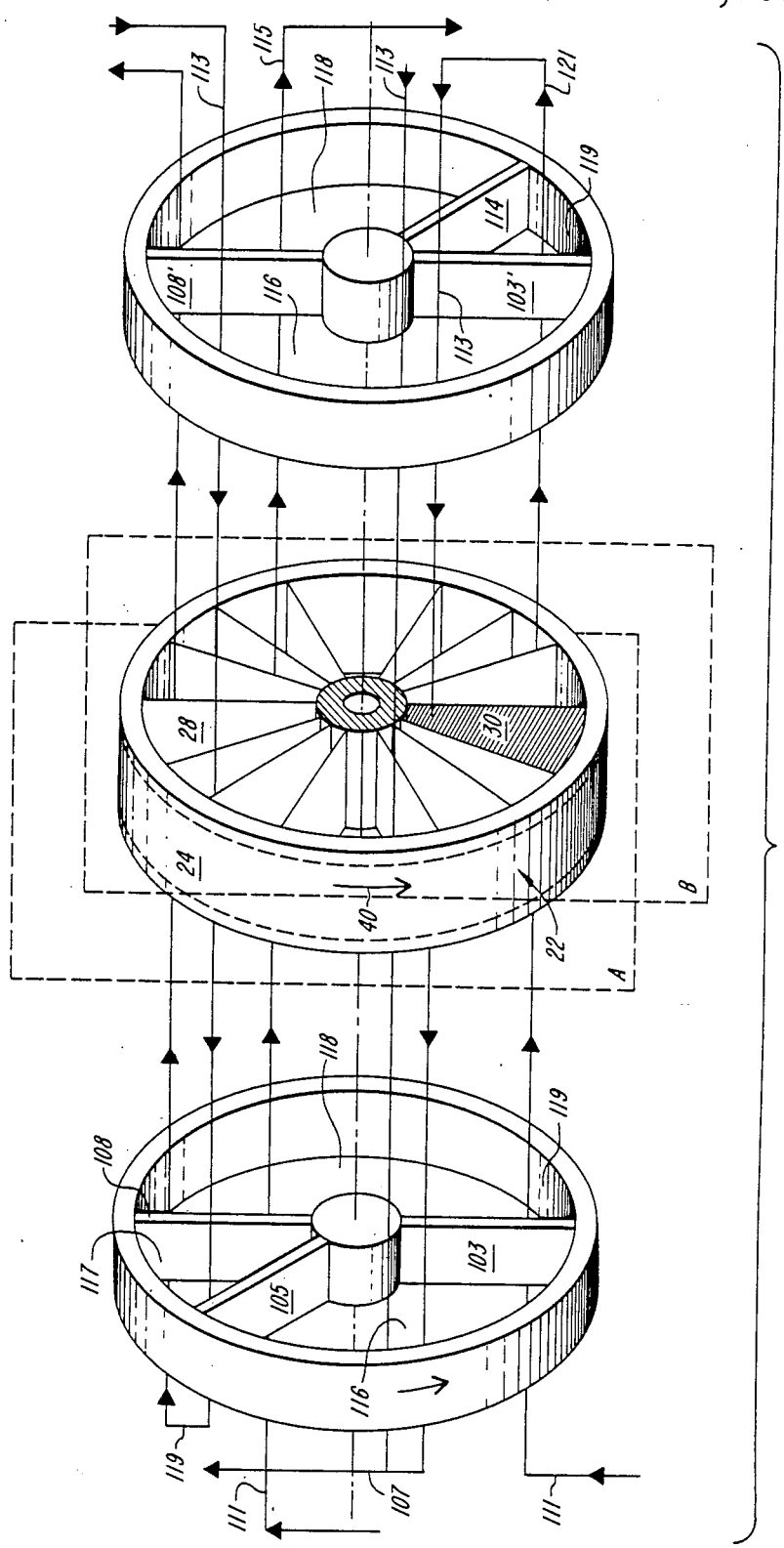
FIG. 9 is an exploded, partly schematic perspective view of a second embodiment of the invention.
Figure 10B:
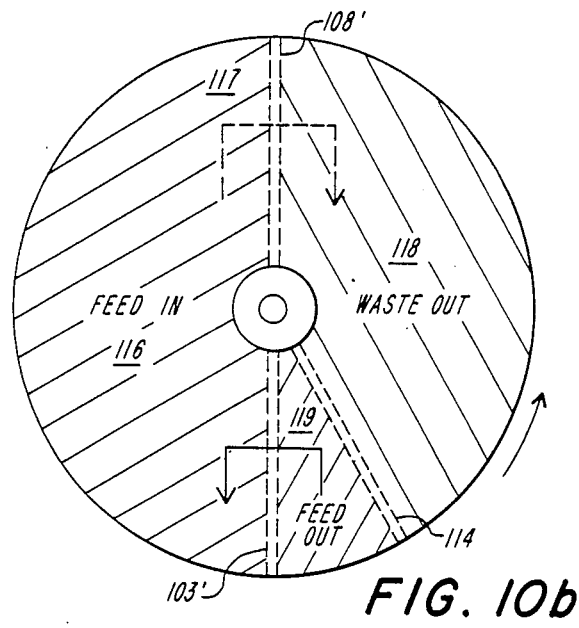
FIGS. 10a, 10b, and 11 further illustrate the rotary bed embodiment of FIG. 9.
Figure 10A:
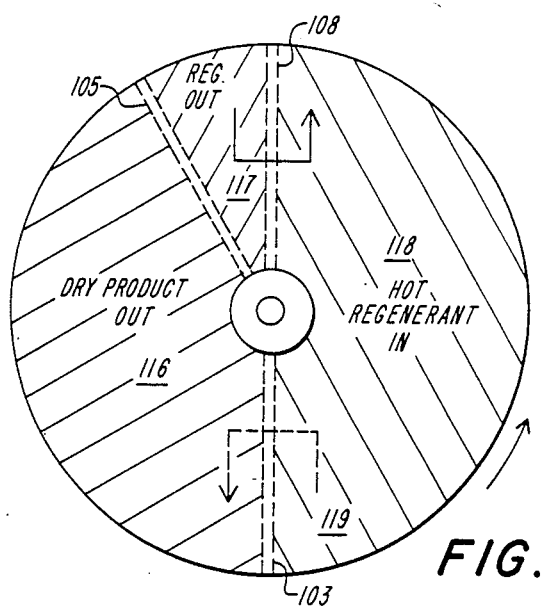
Figure 11:
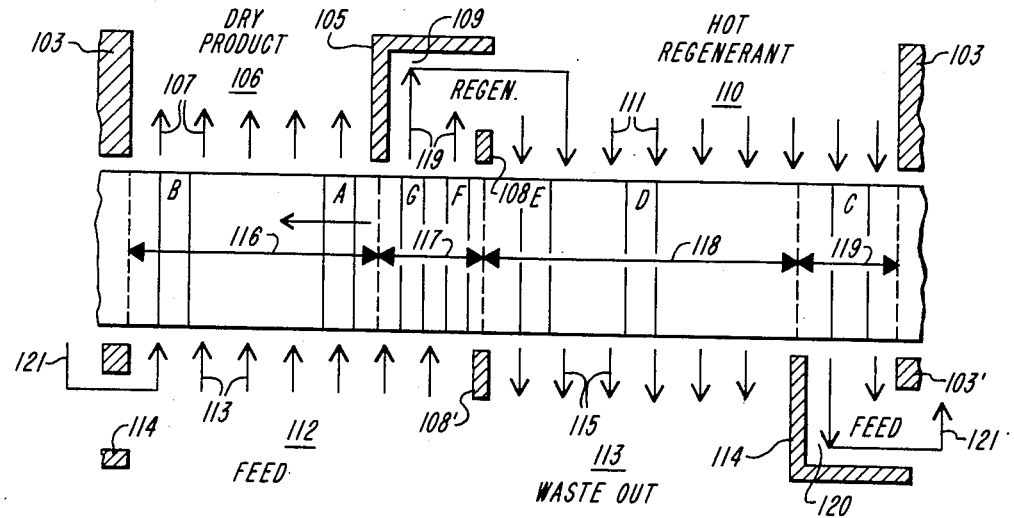
Figure 16:
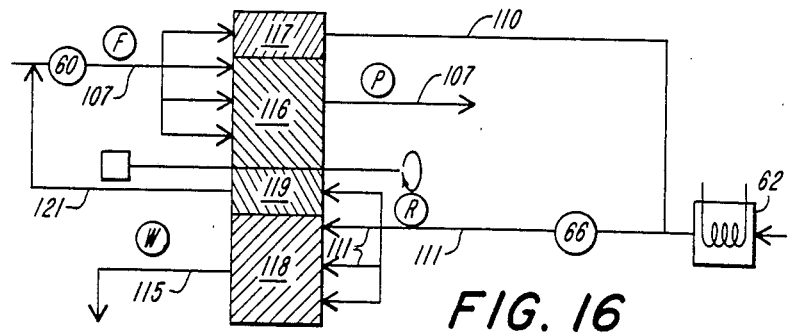
FIG. 16 is a schematic illustration of a rotary bed system embodying the invention of FIGS. 9, 10a, 10b, and 11 showing one flow stream configuration.

FIGS. 9, 10a, 10b, and 11 illustrate additional embodiments of the invention. FIG. 9 shows the rotary bed system in the same way as in FIG. 5. FIGS. 10a and 10b respectively illustrate cross-sections taken through sections of the rotary bed 22 shown in FIG. 9 at planes A and B as viewed from the right of FIG. 9. FIGS. 9 10a, 10b, and 11 differ from FIGS. 5, 6, 7, and 8 in that the vanes and ductwork of the plenum structures used to direct fluid streams through the various regions differ. The vanes are illustrated in FIGS. 9 and 11 and illustrated in phantom in FIGS. 10a and 10b. The various streams they direct are illustrated in FIGS. 9, 11, and 16. Specifically, on the back side of the rotary bed (FIGS. 9, 10a and 11), vanes 103 and 105 comprise a duct 106 for delivering a dry product stream 107 produced in a first, sorption region 116. The sorption region 116 has a leading edge defined by the edge of vane 103 and trailing edge defines the edge of vane 105. Vanes 103 and 108 define a duct 110 for delivering hot regenerant stream 111 into a second region 119 of the bed and into regeneration region 118. Vanes 108 and 105 comprise a duct 109 for directing a hot regenerant stream 119 exiting from a fourth region 117 of the bed.

On the front side of the rotary bed (FIGS. 9, 10b and 11), vanes 103' and 108' comprise a duct 112 for directing a fluid feed stream 113 into first region 116 and second region 117. Vanes 103' and 114 define a duct 120 for directing feed stream 121 produced in second region 119 to supplement feed stream 113. Vanes 114 and 108' comprise a duct 113 for directing fluid waste stream 115 from third region 118.

As can be appreciated from FIGS. 11 and 14, only two blowers, illustrated at 60 and 66, are required in this embodiment. It should also be noted that the design channels feed, produced as regenerant is passed through the second region 119, to supplement feed stream 113 used in first region 116. The design also channels regenerant, produced as feed is passed through the fourth region 117, to supplement regenerant stream 111 used in third region 118. Either one of these returning flows may be employed individually. Preferably they are used together as shown.

Figure 11A:
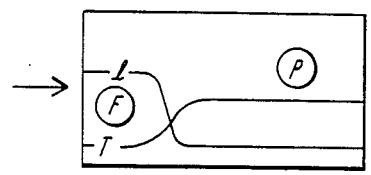
FIGS. 11a–11g are diagrams similar to FIGS. 2A–2G illustrating the state of a bed volume at the points labeled a–g in FIG. 11.
Figure 11B:
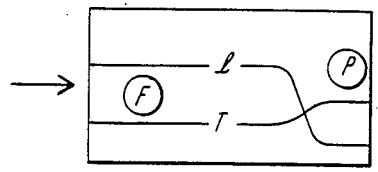
Figure 11C:
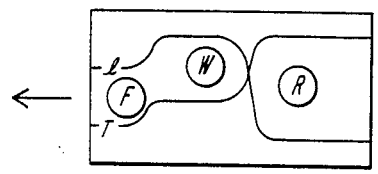
Figure 11D:
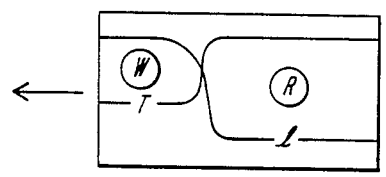
Figure 11E:
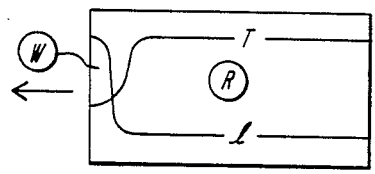
Figure 11F:
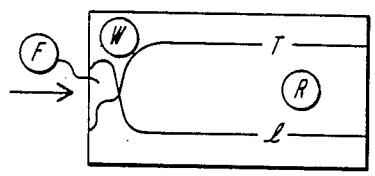
Figure 11G:
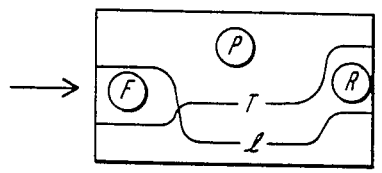

The state of a given volume of sorbent mass in the bed, at positions A-G illustrated in FIG. 11, is shown in FIGS. 11A-11G. At point A feed flows into first region 116 and product exits. An FP front is disposed within the bed volume. At point B, feed from second region 119 completes the sorption phase in first region 116 and the FP front moves along the bed volume in the direction of fluid flow as shown in FIG. 11B. Preferably, the FP front nears breakthrough as the bed volume moves past vanes 103, 103'. At point C, hot regenerant 11 flows countercurrently into the bed volume, forms an RP front (not shown) which collides with the PF front to form an RW front and a WF front as illustrated in FIG. 11C. Feed exits the bed. At point D, the WF front has already broken through, preferably as the bed volume passed from second region 119 into third region 118 past vane 114. Waste exits the bed volume as regenerant is introduced. At point E, regenerant from the fourth region pushes the RW front through the bed. As the volume of sorbent moves into the fourth region past vanes 108, 108', the RW front starts to break through. At point F (FIG. 11F) feed flows countercurrent to the regenerant stream 111, collides with any waste remaining in the bed volume, and forms an FW front. Subsequently, the FW front collides with the WR front creating new fronts FP and PR. At point G (FIG. 11G), after the collision, regenerant exits the bed volume and feed continues to enter. As the bed volume passes back into first region 116, the PR front breaks through, delivering product 107 to conduit 106. The cycle is then repeated.

Figure 19:
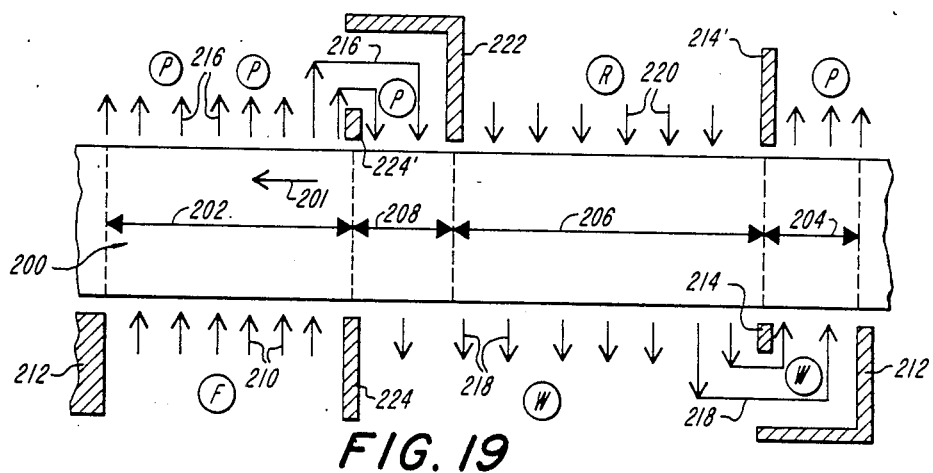
FIG. 19 is a schematic illustration of the type set forth in FIGS. 8 and 11, showing a variation of the embodiment of the invention shown in FIGS. 9, 10a, 10b and 11.

FIG. 19 illustrates another embodiment of the invention which is similar in principle to the embodiment of FIGS. 9–11 and 16. It comprises a mass of sorbent 200 disposed within a rotating housing. A given volume of the sorbent mass passes sequentially in one revolution in the direction of arrow 201 through regions 202, 204, 206 and 208. In first region 202, feed stream 210, for example from an enclosed volume being dehumidified, enters the bed volume and pushes an FP front along the length of the bed volume. Dry product 216 exits and is fed back to the enclosed volume. As the sorbate mass in first region 202 passes vane 212, waste 218 enters the bed cocurrent with the feed stream. The WF front produced collides in second region 204 with the FP front, creating two new fronts having the characteristics of a WR front and an RP front. Product continues to exit the bed in second region 204. Prior to the time the RP front exits the bed volume, it moves past vanes 214, 214', into third region 206 where regenerant 220, e.g., outside air which has been passed through a heater (not shown), enters the bed countercurrent to the flow in the first and second regions. In third region 206 an RW front passes along the bed volume and waste exits the bed. A portion of the waste is directed into second region 204, the remainder is exhausted to outside air. As the bed volume passes by vane 222, product 216 comprising a fraction of product produced in first region 202 passes into the fourth region 208 cocurrent to the regenerant stream. A PR front forms and collides with the RW front in the bed volume producing two new fronts having the characteristics of PF and FW fronts. Preferably as the FW front exits the bed volume, it passes by vanes 224, 224' into first region 202.

It should be noted that this embodiment and the embodiment of FIGS. 9–11 have an inherent feature which has advantages in dehumidifying an enclosed air volume which feature is not present in the recirculating fluid stream embodiments. Specifically, a portion of the regenerant, from outside air, may ultimately be delivered to the enclosed volume to be dehumidified as product. This inward fresh air stream is balanced by feed from the enclosed volume, a portion of which is ultimately exhausted to the outside as waste. Thus, these embodiments continually provide fresh dehumidified air to the enclosed volume with essentially no net heat exchange between the outside and inside air.

The foregoing descriptions of operation of the various embodiments of the invention are somewhat idealized. In order to optimize the cycle for a particular sorbate-sorbent pair and bed volume length, fluid stream velocities and the length of the various regions are best set empirically. However, significant operational advantages as set forth above can be achieved with less than the optimal design. For example, in the embodiment of FIGS. 9–11, if fluid is passed through fourth region 117 at a higher flow rate, the PR front may break through before the volume of sorbent material enters first region 116. In this circumstance, some product is delivered to third region 118 in addition to regenerant. Similarly, high fluid flow rates at point C in the second region may result in the mixing of waste with the effluent 121 in conduit 120. The effect of this is to concentrate feed with waste. Nevertheless, dry product 107 is still produced in duct 106. Similar analysis of the effect of varying the size of the second and fourth regions of the embodiment of FIG. 8 and the embodiment of FIG. 19 shows that they too save a significant quantity of heat and have other operational advantages even when operated in less than the ideal cycle.

Figure 17:
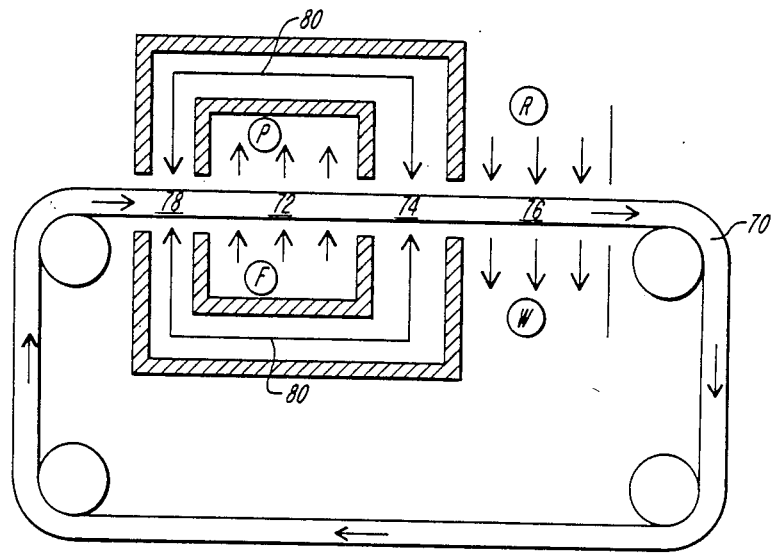
FIG. 17 is a schematic illustration of a recirulating linear bed embodying the invention.

FIG. 17 illustrates schematically a recirculating bed mass 70 of a type wherein a given volume of the mass moves linearly through a sequence of regions for passing fluid through the mass. Regions 72, 74, 76, and 78 correspond respectively with regions 42, 56, 48, and 54 in the embodiment of FIGS. 5–8. The bed system of FIG. 15 operates in the same way as the embodiment of FIGS. 5–8. As illustrated by double pointed arrows 80, the circulating stream may be flowed in either direction.

Figure 18:
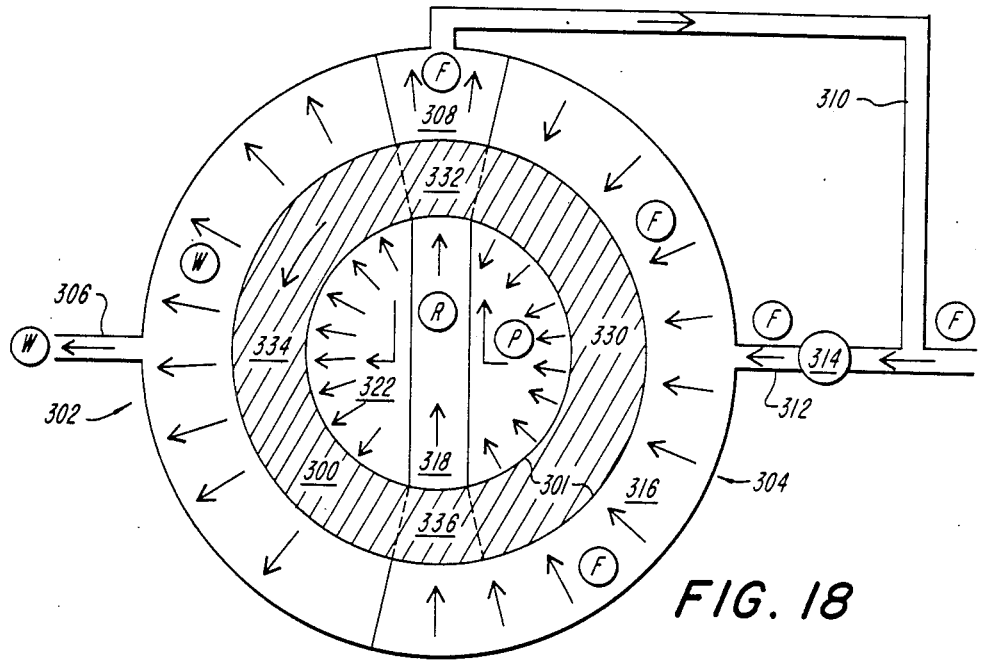
FIG. 18 is a schematic illustration of an annular rotary bed embodying the invention.

FIG. 18 shows another embodiment of the invention. It comprises a mass of sorbent material 300 disposed within a housing 301 defining an annulus. Spaced about the exterior circumference of the annulus are a pair of plenums 302 and 304. Plenum 302 receives waste from sorbent mass passing by it and exhausts waste through conduit 306. Plenum 304 contains a compartment 308 which receives a stream having the characteristics of feed from the sorbent material, and delivers it through conduit 310 to supplement a feed conduit 312. Feed in conduit 312 is moved by fluid mover 314 into a second compartment 316 of plenum 304. Plenum compartment 316 directs feed into the mass of sorbent material passing by it.

On the interior of the annular housing 301, a conduit 318 receives a fluid stream having the characteristics of regenerant and directs it through sorbent material in the housing to compartment 308. Product is collected from the sorbent material in interior plenum compartment 320; regenerant produced by passing fluid through a heater is directed into the sorbent material via compartment 322.

The embodiment of FIG. 18 operates identically to the embodiment of FIG. 8, with the recirculating stream 58 moving in the direction discussed with reference to FIGS. 8B', 8C', 8E', and 8F'. Regions 330, 332, 334, and 336 through which the sorbent mass passes are the equivalent of first region 42, second region 56, third region 48, and fourth region 54 of FIG. 8, respectively. However, the embodiment of FIG. 18 passes the fluids radially through the fluid mass instead of the axial flows of FIGS. 8–11, and illustrates a two-blower configuration (one for moving regenerant, not shown).

SCOPE OF APPLICATION AND SUMMARY OF ADVANTAGES

In view of the foregoing, it should be apparent that the operation and design of rotary sorption beds in the manner described above is accompanied by advantages that may be exploited in various ways. A major advantage is that substantially less heat is needed to regenerate the bed without a commensurate loss in bed capacity. Thus, regeneration is more energy efficient. The system also requires less massive regeneration streams than do conventional systems that are cooled before sorption duty. This implies that the beds can be regenerated at a slower fluid velocity, thereby saving pumping energy, or can be regenerated faster, allowing a higher rate of throughput. The bed need not be as large as a conventionally designed system in order to achieve a given processing capacity. Alternatively, sacrifices in throughput rate may be made in favor of the production of a more sorbate-free product. In this case, the sorption stage is terminated with a larger length of unused bed (the FP front is never permitted to break through). Thus a purer but less massive product is produced. Another advantage is that the product is not contaminated with hot fluids, and the waste emitted is cooler (on average) and more concentrated. An advantage of embodiments of the second type is that they have a built-in ventilating capability. All of the designs return the bed to sorption duty dryer than do conventional rotary beds employing no separate cooling stage. The beds of the invention are the thermodynamic equivalent of a rotary bed which employs a cooling stage flow and thus takes advantage of the stripping front to remove sorbate remaining in the bed in equilibrium with regenerant. Yet, beds of the invention do not waste the sensible heat of the bed.

The hot regenerant fluid may comprise heated feed, heated product, a separate heated purge gas, or hot recirculated waste from which sorbate has been partially removed. As used herein, "waste" includes systems where the goal is to concentrate sorbate from a dilute stream. Improved performance can be obtained through the use of the systems for all of these regeneration fluids. It is also contemplated that feed (or wet purge fluid) may be used as coolant fluid if product of higher sorbate content is tolerable.

Beds operated in accordance with the invention may comprise many different sorbate/sorbent pairs. Non-limiting examples include:

$H_2O$/silica gel
$H_2O$/alumina gel
$H_2O$/molecular sieve zeolite
$CO_2$/activated carbon
$CO_2$/molecular sieve zeolite
Hg/zeolite
Hg/activated carbon
$NO_x$/zeolite
$NO_x$/activated carbon
$SO_x$/zeolite
$SO_x$/activated carbon
$H_2S$/zeolite
$H_2S$/activated carbon
salt/thermally regenerable ion exchange resin
organic species/activated carbon
$H_2O$/$LiCl_2$
$H_2O$/hygroscopic salt In addition, beds consisting of mixtures of sorbents or multiple layers of different sorbents and inerts such as disclosed in U.S. Pat. No. 3,738,084 can benefit from the system.

The invention may thus be embodied in other specific forms without departing from the spirit and scope thereof. Accordingly, other embodiments are within the following claims.

What is claimed is:

1. A method of operating a sorption bed system comprising a mass of thermally regenerable sorbent material, said method comprising the steps of:
   A. providing a course comprising a series of means for circulating fluid streams sequentially through a given volume of said mass;
   B. moving either said mass or said course whereby said given volume sequentially passes, during a cycle, through first, second, third, and fourth regions;
   C. passing a fluid feed containing sorbate through sorbent material in said first region in a first direction to produce a fluid product of reduced sorbate concentration and to load sorbate onto sorbent material in said first region;
   D. passing a hot regenerant fluid through sorbent material in said third region countercurrent to said first direction to produce a fluid effluent comprising a sorbate-rich waste and to heat sorbent material in said third region; and
   E. recirculating fluid between sorbent material in said second region, cocurrent to said first direction, and sorbent material in said fourth region countercurrent to said first direction.

2. The method of claim 1 wherein said moving step is effected by rotating said mass about an axis.

3. The method of claim 1 wherein said recirculating fluid communicates with a portion of said fluid effluent.

4. The method of claim 1 wherein said recirculating fluid communicates with a portion of said fluid product.

5. The method of claim 1 wherein said recirculating fluid communicates with a portion of said hot regenerant.

6. The method of claim 1 wherein said recirculating fluid communicates with a portion of said fluid feed.

7. The method of claim 1 wherein the recirculating fluid passing through said second region is circulated countercurrently to the fluid feed passing through said first region.

8. The method of claim 1 wherein the circulating fluid passing through said second region is recirculated cocurrently to the fluid feed passing through said first region.

9. The method of claim 1 wherein said fluid feed comprises moist air, said sorbate comprises water, and said product comprises air of reduced water concentration.

10. A method of operating a sorption bed system comprising a mass of thermally regenerable sorbent material, said method comprising the steps of:
   A. providing a course comprising a series of means for circulating fluid streams sequentially through a given volume of said mass;
   B. moving one of said mass and said course whereby said given volume sequentially passes, during a cycle, through first, second and third regions, said first region having a leading edge and a trailing edge;
   C. passing a fluid feed stream containing sorbate through sorbent material in said first region to produce a fluid product stream of reduced sorbate concentration and to load sorbate onto sorbent material in said first region;
   D. passing a hot regenerant fluid stream through sorbent material in said third region, countercurrent to said feed stream, to produce a fluid effluent stream comprising a sorbate-rich waste and to heat sorbent material in said third region;
   E. passing a hot regenerant fluid stream through sorbent material in said second region, countercurrent to said feed stream, to produce an effluent, said second region being disposed between the leading edge of said first region and said third region; and
   F. directing effluent from said second region through sorbent material in said first region cocurrent to said feed stream.

11. The method of claim 10 comprising the additional step of:
  G. passing a fluid feed stream through sorbent material in a fourth region, said fourth region being disposed between the leading edge of said first region and said third region, to produce a fluid effluent; and
  H. directing effluent from said fourth region through sorbent material in said third region cocurrent to said hot regenerant stream.

12. A method of operating a sorption bed system comprising a mass of thermally regenerable sorbent material, said method comprising the steps of:
  A. providing a course comprising a series of means for circulating fluid streams sequentially through a given volume of said mass;
  B. moving either said mass or said course whereby said given volume sequentially passes, during a cycle, through first, second, third, and fourth regions, and first region having a leading edge and a trailing edge;
  C. passing a fluid feed stream containing sorbate through sorbent material in said first region to produce a fluid product stream of reduced sorbate concentration and to load sorbate onto sorbent material in said first region;
  D. passing a hot regenerant fluid stream through sorbent material in said third region, countercurrent to said feed stream, to produce a fluid effluent stream comprising a sorbate-rich waste and to heat sorbent material in said third region;
  E. passing a portion of said fluid product through sorbent material in said fourth region, cournter-current to said feed stream, to product an effluent comprising a sorbate-rich waste, said fourth region being disposed between the trailing edge of said first region and said third region;
  F. passing a portion of said fluid effluent stream through sorbent material in a second region, said second region being disposed between the leading edge of said first region and said third region, to product a fluid effluent; and
  G. direction effluent from said second region to supplement said fluid product stream.

13. A method of operating a sorption bed system comprising a mass of thermally regenerable sorbent material, said method comprising the steps of:
  A. providing a course comprising a series of means for circulating fluid streams sequentially through a given volume of said mass;
  B. moving one of said mass and said course whereby, during cycle, said given volume sequentially passes through first, second, and third regions;
  C. passing a fluid feed stream containing sorbate through sorbent material in said first region to produce a fluid product stream of reduced sorbate concentration and to load sorbate onto sorbent material in said first region;
  D. passing a hot regenerant fluid stream through sorbent material in said third region, countercurrent to said feed stream, to produce a fluid effluent stream comprising a sorbate-rich waste and to heat sorbent material in said third region;
  E. passing a portion of said fluid effluent stream through sorbent material in said second region, said second region being disposed between the leading edge of said first region and said third region, to produce a fluid effluent; and
  F. directing effluent from said second region to supplement said fluid product stream.

14. A sorption bed system of improved efficiency comprising a mass of thermally regenerable sorbent material and a course comprising a series of means for directing fluid streams sequentially through a given volume of said mass of sorbent, said system comprising:
  first means for passing a fluid feed containing sorbate through a first region containing sorbent material to produce a fluid product of reduced sorbate concentration and to load sorbate onto the sorbent material in said first region;
  third means for passing, countercurrent to the direction of flow in said first means for passing, a hot regenerant fluid through a third region containing sorbent material to produce a fluid effluent comprising a sorbate-rich waste and to heat sorbent material in said third region;
  means for recirculating fluid between a second region containing sorbent material, said second region being disposed between said first and third regions, and a fourth region containing sorbent material, said fourth region being disposed between said third and first regions, the direction of recirculating in said second region being cocurrent to fluid passing through said first means for passing, and the direction of recirculating in said fourth region being cocurrent to fluid passing through said third means for passing; and
  means for moving one of said mass and said course whereby said given volume sequentially passes through said first, second, third, and fourth regions, and back to said first region.

15. The system of claim 14 wherein said mass has a circular cross-section and is disposed about a central axis, said moving means comprises means for rotating said mass about said central axis, and said first and third means and means for recirculating comprise means spaced about said axis for directing fluids axially through said regions.

16. The system of claim 15 wherein said fluid feed comprises moist air, said sorbate comprises water, and said fluid product comprises air of reduced water concentration.

17. The system of claim 14 wherein said mass has an annular cross-section and is disposed about a central axis, said moving means comprises means for rotating said mass about said central axis, and said first and third means and means for recirculating comprise means for directing fluids radially through said regions.

18. The system of claim 14 wherein said means for recirculating comprises a blower.

19. The system of claim 14 wherein said means for recirculating comprises a loop of conduits communicating between said second and fourth regions.

20. The system of claim 19 wherein said loop includes an inlet means for receiving a portion of said fluid effluent and an outlet.

21. The system of claim 19 wherein said loop includes an inlet means for receiving a portion of said hot regenerant fluid and an outlet.

22. The system of claim 19 wherein said loop includes an inlet means for receiving a portion of said fluid feed and an outlet.

23. The system of claim 19 wherein said loop includes an inlet means for receiving a portion of said fluid product and an outlet.

24. The system of claim 14 wherein said fluid feed comprises moist air, said sorbate comprises water, and said fluid product comprises air of reduced water concentration.

25. The system of claim 24 for dehumidifying an enclosed air volume wherein said first means comprises an inlet means for receiving air from said enclosed air volume and means for directing said product to said air volume, and said third means comprises inlet means for receiving air from outside said enclosed volume, a heater for heating said outside air, and means for directing said fluid effluent from said third region outside said enclosed volume.

26. The system of claim 14 wherein said mass is disposed upon a belt and said moving means comprises means for moving said mass along a linear course.

27. A sorption bed system of improved operational efficiency comprising a mass of thermally regenerable sorbent material and a course comprising a series of means for sequentially directing fluid streams through a given volume of said mass of sorbent, said system comprising:
first means for passing a fluid feed stream containing sorbate through a first region containing sorbent material, said first region having leading and trailing edges, to produce a fluid product comprising a fluid of reduced sorbate concentration and to load sorbate onto the sorbent material in said first region;
third means for passing a hot regenerant fluid stream through a third region containing sorbent material to produce a fluid effluent comprising a sorbate-rich waste and to heat sorbent material in said third region;
second means for passing a portion of said hot regenerant fluid through a second region containing sorbent material and for directing effluent from said second region to supplement said fluid feed stream, said second region being disposed between the leading edge of said first region and said third region; and
means for moving one of said mass and said course whereby said given volume, in a cycle, sequentially passes through said first, second, and third regions.

28. The system of claim 27 further comprising fourth means for passing a portion of said fluid feed stream through a fourth region containing sorbent material and for directing effluent from said fourth region to supplement said regenerant stream, said fourth region being disposed between the trailing edge of said first region and said third region.

29. The system of claim 28 wherein said mass has a circular cross-section and is disposed about a central axis, said moving means comprises means for rotating said mass about said central axis, and said first, second, and third means comprise means spaced about said axis for directing fluids through sorbent material in said regions.

30. The system of claim 28 wherein said fluid feed comprises moist air, said sorbate comprises water, and said fluid product comprises air of reduced water concentration.

31. The system of claim 30 for dehumidifying an enclosed air volume wherein said first means comprises an inlet means for receiving air from said enclosed air volume and means for directing at least a portion of said fluid product to said air volume, and said third means comprises inlet means for receiving air from outside said enclosed volume, a heater for heating said outside air, and means for directing said fluid effluent from said third region outside said enclosed volume.

32. The system of claim 28 wherein said mass has an annular cross-section and is disposed about a central axis, said moving means comprises means for rotating said mass about said central axis, and said first, second, third, and fourth means comprise means for passing fluids radially through said mass.

33. A sorption bed system of improved operational efficiency comprising a mass of thermally regenerable sorbent material and a course comprising a series of means for sequentially directing fluid streams through a given volume of said mass of sorbent, said system comprising:
first means for passing a fluid feed stream containing sorbate through a first region containing sorbent material, said first region having leading and trailing edges, to produce a fluid product comprising a fluid of reduced sorbate concentration and to load sorbate onto the sorbent material in said first region;
third means for passing a hot regenerant fluid stream through a third region containing a sorbate-rich waste and to heat sorbent material in said third region;
fourth means for passing a portion of said fluid product through a fourth region containing sorbent material and for directing effluent from said fourth region to supplement said fluid effluent, said fourth region being disposed between the trailing edge of said first region and said third region;
second means for passing a portion of said fluid effluent through a second region containing sorbent material and for directing effluent from said second region to supplement said fluid product, said second region being disposed between the leading edge of said first region and said third region, and
means for moving either said mass or said course whereby said given volume, in a cycle, sequentially passes through said first, second, third, and fourth regions.

34. The system of claim 33 wherein said mass has a circular cross-section and is disposed about a central axis, said moving means comprises means for rotating said mass about said central axis, and said first, third, and fourth means comprise means spaced about said axis for directing fluids axially through sorbent material in said regions.

35. The system of claim 33 wherein said fluid feed comprises moist air, said sorbate comprises water, and said fluid product comprises air of reduced water concentration.

36. The system of claim 35 for dehumidifying an enclosed air volume wherein said first means comprises an inlet means for receiving air from said enclosed air volume and means for directing at least a portion of said fluid product to said air volume, and said third means comprises inlet means for receiving air from outside said enclosed volume, a heater for heating said outside air, and means for directing said fluid effluent from said third region outside said enclosed volume.

37. The system of claim 36 further comprising second means for passing a portion of said fluid effluent through a second region containing sorbent material and for directing effluent from said second region to supplement said fluid product, said second region being disposed between said third region and the leading edge of said first region.

38. The system of claim 33 wherein said mass has an annular cross-section and is disposed about a central axis, said moving means comprises means for rotating said mass about said central axis, and said first, third and fourth means comprise means for directing fluids radially through said regions.

39. A sorption bed system of improved operational efficiency comprising a mass of thermally regenerable sorbent material and a course comprising a series of means for directing fluid streams sequentially through a given volume of said mass of sorbent, said system comprising:

first means for passing a fluid feed stream containing sorbate through a first region containing sorbent material, said first region having leading and trailing edges, to produce a fluid product comprising a fluid of reduced sorbate concentration and to load sorbate onto the sorbent material in said first region;

third means for passing a hot regenerant fluid stream through a third region containing sorbent material to produce a fluid effluent comprising a sorbate-rich waste and to heat sorbent material in said third region;

second means for passing a portion of said fluid effluent through a second region containing sorbent material and for directing effluent from said second region to supplement said fluid product, said second region being disposed between said third region and the leading edge of said first region; and means for moving one of said mass and said course whereby said given volume sequentially passes, in a cycle, through said first, second, and third regions.

* * * * *